United States Patent
Hyodo et al.

(10) Patent No.: US 7,821,658 B2
(45) Date of Patent: Oct. 26, 2010

(54) INTERLEAVING IMAGING DEVICE CONTROLLER WITH MULTI-USE CIRCUITRY

(75) Inventors: Keiichiro Hyodo, Los Gatos, CA (US); Peter Johnston, San Mateo, CA (US); Allan Hessenflow, Los Gatos, CA (US)

(73) Assignee: Minolta Co., Ltd, Osaka-shi (JP)

( * ) Notice: Subject to any disclaimer, the term of this patent is extended or adjusted under 35 U.S.C. 154(b) by 1068 days.

(21) Appl. No.: 10/272,442

(22) Filed: Oct. 15, 2002

(65) Prior Publication Data
US 2003/0103225 A1   Jun. 5, 2003

Related U.S. Application Data

(60) Provisional application No. 60/329,645, filed on Oct. 16, 2001.

(51) Int. Cl.
*G06F 3/12* (2006.01)
(52) U.S. Cl. .................................. 358/1.15
(58) Field of Classification Search ............... 358/1.15, 358/425, 426.01, 468; 385/166
See application file for complete search history.

(56) References Cited
U.S. PATENT DOCUMENTS

| | | | | |
|---|---|---|---|---|
| 5,057,940 A | * | 10/1991 | Murakami et al. | 382/243 |
| 5,307,458 A | * | 4/1994 | Freiburg et al. | 345/503 |
| 5,461,704 A | * | 10/1995 | Wakabayashi et al. | 358/1.15 |
| 5,566,254 A | * | 10/1996 | Murata et al. | 382/304 |
| 5,739,920 A | * | 4/1998 | Nakajima et al. | 382/240 |
| 5,905,505 A | * | 5/1999 | Lesk | 345/630 |
| 6,188,440 B1 | * | 2/2001 | Toujima et al. | 348/554 |
| 6,862,101 B1 | * | 3/2005 | Miyazaki et al. | 358/1.13 |
| 2002/0015170 A1 | * | 2/2002 | Kamei et al. | 358/1.13 |

* cited by examiner

*Primary Examiner*—Edward L Coles
*Assistant Examiner*—Jacky X Zheng
(74) *Attorney, Agent, or Firm*—Morrison & Foerster LLP

(57) ABSTRACT

An imaging device with an improved controller is disclosed wherein the controller eliminates duplicated circuitry and provides multiuser circuitry that efficiently replaces multiple dedicated circuit blocks. In one aspect, duplicated same-function circuit blocks are replaced with a switch controlled by an alignment control signal to operate as a multiplexer or demultiplexer. In another aspect, multiple different-function circuit blocks which generally have no temporal overlap of their active operation are replaced with a programmable logic device that is reconfigured dynamically to perform some subset of the different functions on an as-needed basis.

8 Claims, 5 Drawing Sheets

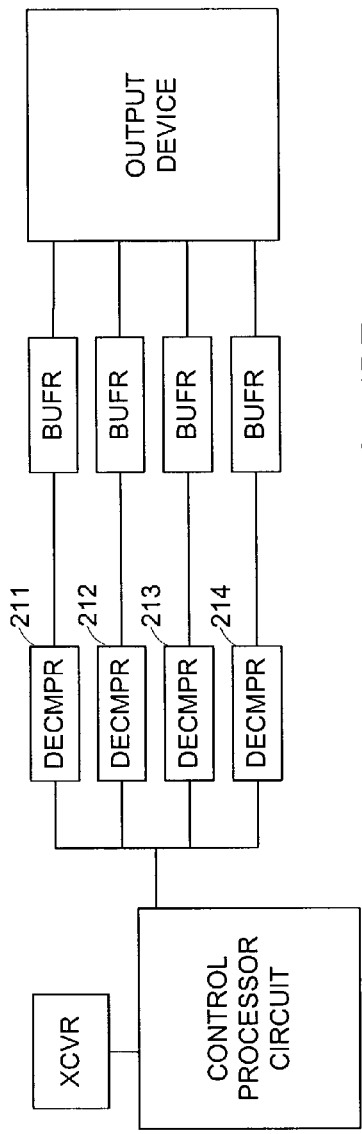
*Figure 2 -- PRIOR ART*
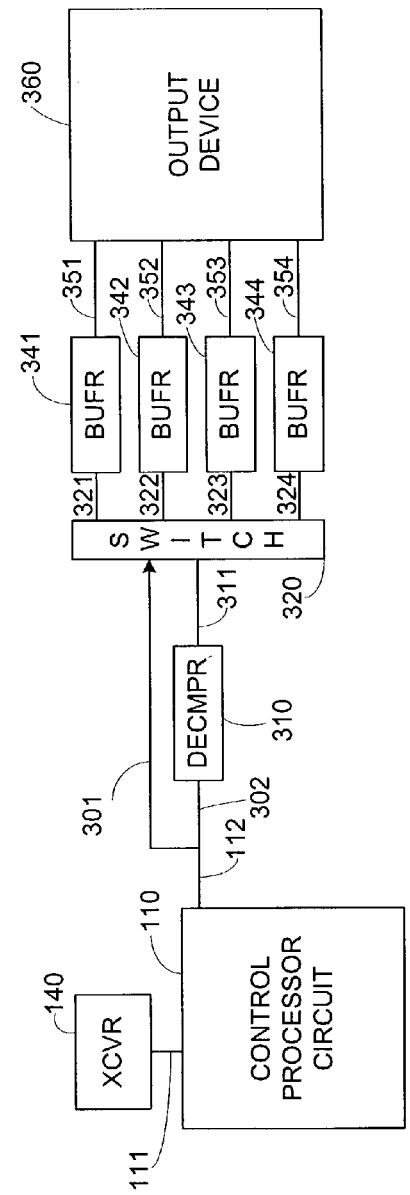
*Figure 3*

INTERLEAVING IMAGING DEVICE CONTROLLER WITH MULTI-USE CIRCUITRY

CROSS-REFERENCES TO RELATED APPLICATIONS

This application claims the benefit of the earlier-filed provisional application, No. 60/329,645, filed Oct. 16, 2001 in the United States Patent and Trademark Office and entitled "Interleaving Printer/Copier Controller with Multi-Use Circuitry."

BACKGROUND OF THE INVENTION

1. Field of the Invention

This invention relates to electronic imaging methods and devices and in particular to digital controller circuitry for the same.

2. Description of Related Art

Controllers for document imaging devices such as laser printers, copiers, and multi-function machines often have to operate on multiple data streams or components related to a single image. For example, a color device may process each of the CYMK (cyan, yellow, magenta, black) color components separately. Multiple sets of circuitry have been incorporated in the controllers to handle the multiplicity of data components. This multiplicity of circuitry increases the manufacturing and operating cost of the device.

For example, imaging devices frequently include compression and/or decompression circuitry to minimize the amount of data that needs to be stored or transferred. Where there are multiple data streams for individual components, prior art controllers have included multiple compressor and/or decompressor circuits such as the four decompressor circuits 211-214 shown in FIG. 2.

Further, controllers for multi-function machines, such as printer/scanner/copiers, have included circuitry dedicated to particular ones of its functions. Such circuitry remains idle, consuming space and possibly power even when its associated function is not being performed.

Accordingly, there is a need in the art for controller circuitry that eliminates duplicate and underutilized circuit elements.

SUMMARY OF THE INVENTION

One inventive aspect of the embodiments disclosed and discussed below is the use of a single functional circuit, such as a decompressor, in conjunction with an electrically controllable switch circuit to perform a multiplexing function, such as demultiplexing. The functional circuit and switch work together in the controller of an imaging device to process parallel, related channels of image data. For example, the parallel channels may represent the cyan (C), yellow (Y), magenta (M), and black (K) color components of a single image represented digitally using the well-known CYMK color model. Sharing of the functional circuitry in this way among the multiple channels eliminates the need to duplicate circuitry once for each channel.

In another inventive aspect of disclosed embodiments, certain functional circuitry of the imaging device controller, such as a decompressor circuit, is implemented using a programmable logic device programmed with configuration data to perform the first desired function. The programmable logic device may be, for example, and FPGA. During a period of device operation where the particular functional circuitry is not required but other functional circuitry is, such as a compressor circuit, the programmable logic device is reprogrammed with configuration data to perform the second desired function instead of the first.

This inventive aspect is particularly useful in the controller circuitry of a multifunction imaging device. For example, when the multi-function imaging device is printing it has need for decompression circuitry to decompress the image data it receives to print. However, it has no need for compression circuitry. In contrast, when the multifunction imaging devices scanning it has need for compression circuitry to compress the image data it will transmit. However, it has no need at that time for decompression circuitry. By using programmable logic to implement temporally non-overlapping functions, cost, space, manufacturing complexity, and power consumption can all be reduced.

These and other purposes and advantages will become more apparent to those skilled in the art from the following detailed description in conjunction with the appended drawings.

BRIEF DESCRIPTION OF THE DRAWINGS

FIG. 2 depicts a prior art controller.

FIG. 3 depicts a controller employing a shared circuit aspect of the present invention.

In the figures just described, like numbers appearing in multiple figures identify a common element.

DETAILED DESCRIPTION

The present invention provides an improved controller for electronic imaging devices such as printers, scanners, copiers, and multi-function machines. In the following description, numerous details are set forth in order to enable a thorough understanding of the present invention. However, it will be understood by those of ordinary skill in the art that these specific details are not required in order to practice the invention. Further, well-known elements, devices, process steps and the like are not set forth in detail in order to avoid obscuring the present invention.

Figure 1:
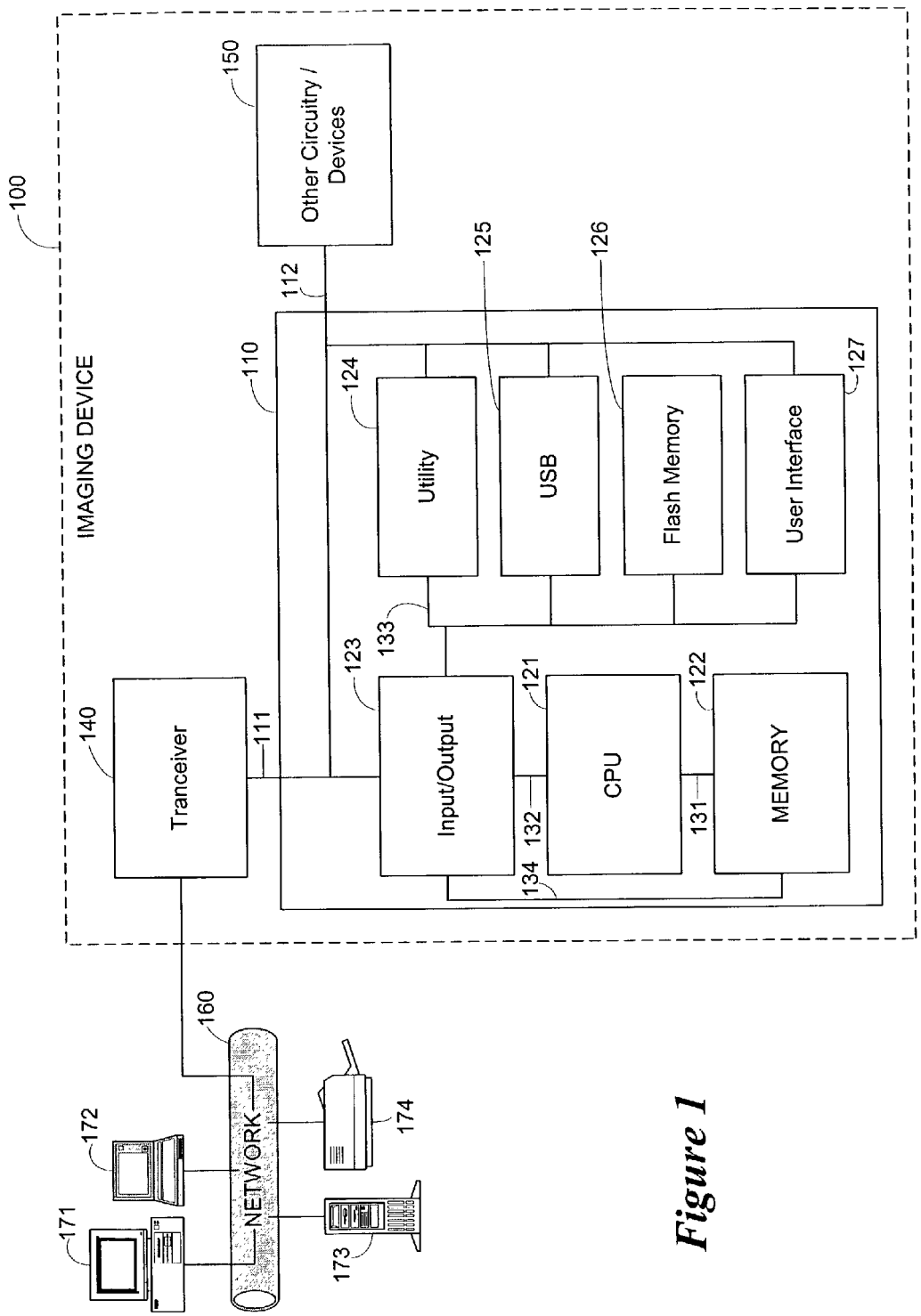
FIG. 1 depicts a block diagram of an imaging device and typical operating environment.

FIG. 1 depicts a block diagram of an imaging device in one possible operating environment. The representative operating environment includes network 160 and attached user workstations 171, 172, server 173, and printer 174. Imaging device 100 is also attached to the network 160. Users of workstations 171, 172 may utilize imaging device 100 by direct communication using network 160, or the users of the workstations may utilize imaging device indirectly by means of server 173. The representative operating environment shown his merely illustrative.

The emphasis of the detail shown in FIG. 1 for imaging device 100 regards the circuitry of control processor 110. In subsequent figures control processor 110 will be shown without such detail. Control processor 110 in a preferred embodiment is a software-based computer system dedicated to the operation and support of the imaging device.

In addition to control processor 110, imaging device 100 comprises transceiver circuit 140, and other circuitry/devices 150. Control processor 110 comprises CPU 121, memory subsystem 122, I/O interface circuitry 123, utility circuitry 124, USB interface circuitry 125, flash memory circuitry 126, and user interface circuitry 127. Control processor 110 further comprises connection 131 for coupling CPU 121 with the memory subsystem 122; connection 132 for coupling the CPU 121 and I/O interface circuitry 123; connection 133 for coupling CPU 121, via connection 132 and I/O interface circuitry 123, to utility circuitry 124, USB interface circuitry 125, flash memory circuitry 126, and user interface circuitry 127; and connection 134 for coupling I/O interface circuitry 123 to memory subsystem 122 for direct memory access (DMA) operation. Similarly, connection 111 of control processor 110 couples CPU 121 to transceiver circuit 140; and connection 112 of control processor 110 couples CPU 121 to other circuitry/devices 150.

The connections described above are pathways for the operational flow of signals from place to place within the imaging device. The connections may comprise, for example, conductors, cables, connectors, and intermediate circuitry as prescribed by a particular design. Further, the connections described above may be single line, multiline, or buses; unidirectional or bidirectional; and carry data signals, control signals, or both; as prescribed by a particular design. Such details do not limit the invention and are within the purview of one skilled in the art.

In the preferred embodiment, CPU 121 is a microprocessor. The CPU operates as a control circuit and plays a role in coordinating the operation of various components in the imaging device. Memory subsystem 122 comprises memory management circuitry, random access memory (RAM), and synchronous dynamic RAM (SDRAM) (none of which are individually shown). I/O interface circuitry 123 provides industry standard computer buses such as IDE and PCI, and DMA control functions. Flash memory circuitry 126 provides nonvolatile data storage. Flash memory is used to store a persistent copy of the software that allows the imaging device to function. In addition to nonvolatility, flash memory has the advantage that it can be electrically rewritten. This allows updates to the operating software of the imaging device after manufacture.

USB interface circuitry 125 provides the control processor with the ability to communicate using the universal serial bus (USB) standard, preferably the latest version. As depicted here, USB interface circuitry 125 connects only to other circuitry and devices 150 that are part of the imaging device 100. For example, the imaging device may include a full-size keyboard in which case a standard USB keyboard could be utilized and coupled to the CPU by USB interface circuitry 125. One skilled in the art recognizes that circuitry such as USB interface circuitry 125 could implement the transceiver circuitry 140 in an operating environment where the imaging device attaches directly to a user workstation, such as 171, rather than to a network 160. Furthermore, one skilled in the art recognizes that control processor 110 may allow both transceiver 140 and USB interface circuitry 125 to either perform the functions of transceiver circuit 140 as described herein.

User interface circuitry 127 processes signals as required to interface CPU 121 to user interface devices represented in FIG. 1 as other circuitry/devices 150. User interface devices include display devices, such as multiline LCD panels and indicator LEDs, and input devices such as keypads and buttons. The user interface devices are generally contained on a central control panel of the imaging device.

Utility circuitry 124 processes signals as required to interface CPU 121 to certain other circuitry/devices 150 that are not interfaced by means of I/O circuitry 123, USB interface circuitry 125, nor user interface circuitry 127. For example, utility circuitry 124 may generate control signals for an electromechanical device such as a solenoid.

Transceiver circuitry 140 in one embodiment is a network interface chip (NIC) and support circuitry based on ethernet standards. As its name implies, transceiver 140 comprises both a receiver circuit and a transmitter circuit. Transceiver circuitry 140 enables users to communicate with imaging device 100 in order to make use of it. For example, a user desiring to exploit the printing capability of imaging device 100 would transmit a stream of print data via network 160 to the receiver circuit of transceiver 140. Control processor 110 would acquire the data from the transceiver via connection 111. Control processor 110 would direct status messages back to the user by applying appropriate data and control signals to the transmitter circuit of transceiver 140 via connection 111.

Other circuitry/devices 150 as depicted here represents for purposes of FIG. 1 the kinds of electrical and electromechanical circuitry and components common to an imaging device not specifically discussed in relation to FIG. 1. For example, other circuitry/devices 150 may include image output devices such as laser print engines and facsimile modem transmitters; and image input devices such as scanning heads and facsimile modem receivers; present in a particular embodiment.

FIG. 3 depicts one embodiment of a device controller employing a shared circuit aspect of the present invention. The control circuit of FIG. 3 advances beyond the prior art circuit depicted in FIG. 2. Decompressor 310 is the shared circuit of the embodiment depicted in FIG. 3. In this embodiment, one decompressor circuit 310 in conjunction with a switch circuit 320, permits the one decompressor circuit 310 to decompress the data for four separate data streams, each representing a single color channel of the CYMK color model in this embodiment. Sharing the decompressor circuit among the four color channels eliminates the need to duplicate the decompressor circuitry four times.

The device controller of FIG. 3 comprises transceiver 140, control processor circuit 110, decompressor 310, switch 320, buffers 341-344, and connections 111, 112, 301, 311, 321-324 and 351-354. Switch connection 311 is a multiplex connection that carries data associated with multiple channels of image data, while connections 321-324 are data channel connections each carrying data for only a single image data channel. Output device 360 receives the multichannel, uncompressed image data from the device controller. Output device 360 is, for example, a laser printing engine.

In operation, the receiver circuit of transceiver 140 receives a print datastream containing compressed data for four different color data channels. The received datastream data is conveyed to control processor 110 via connection 111. Control processor 110 analyzes the serial datastream and identifies the beginning of a portion thereof associated with a particular data channel. Control processor 110 then generates and sends an alignment control signal via connection 301 to switch 320. The control signal causes switch 320 to direct the data it receives on connection 311 to the particular one of buffers 341-344 associated with the identified data channel. Switch 320 accordingly operates as a demultiplexer. After sending the alignment signal to switch 320, control processor 110 sends the compressed datastream segment data associated with the particular data channel to decompressor circuit 310 via connection 302.

Decompressor circuit 310 decompresses the data received via connection 302, presenting the data in uncompressed form at its output connection 311. In the preferred embodiment, decompressor 310 decompresses data that was formerly compressed using a run length encoding (RLE) algorithm. RLE compression is widely known in the art.

Uncompressed data presented to switch 320 from decompressor 310, moves from switch 320 to the correct one of buffers 341-344 via the corresponding one of connections 321-324. The uncompressed, multi-channel image data is transferred from buffers 341-344 to output device 360 by connections 351-354 in accordance with the requirements of the output device.

Figure 4:
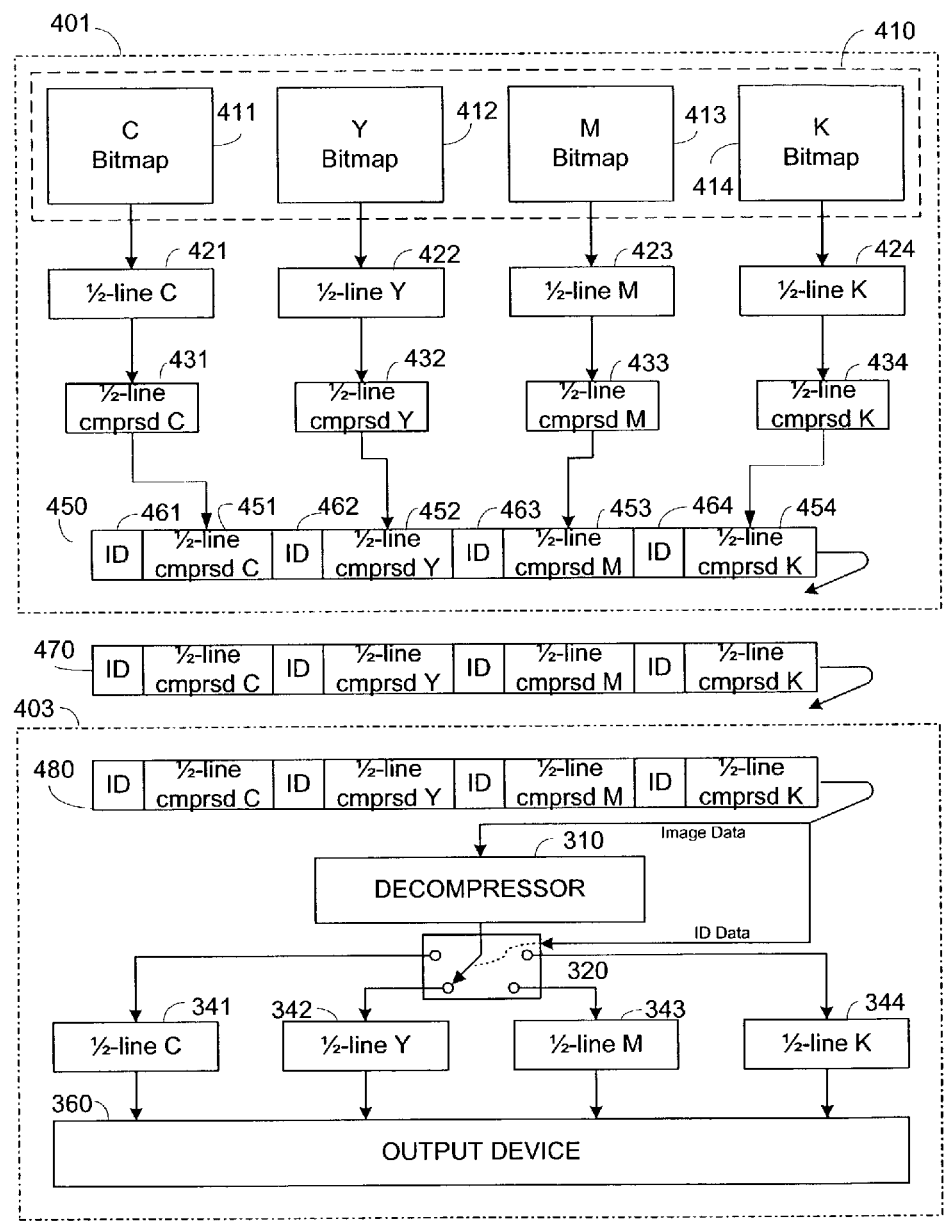
FIG. 4 depicts a block diagram of the operational flow of one embodiment employing a shared circuit aspect of the present invention.

FIG. 4 depicts a block diagram of the operational data flow of one embodiment employing a shared circuit aspect of the present invention. The progression depicted in box 401 of FIG. 4 executes on the machine that will send its output to the imaging device. For example, when a workstation user desires to print a color photograph on the imaging device (e.g., a color laser printer) and initiates that process, the progression depicted in box 401 executes on the workstation. The progression depicted in box 401 might generally be effected by driver software associated with the imaging device.

A complete bitmap for the printed image 410 is generated appropriate to the output device 360. In the example depicted in FIG. 4, the constructed bitmap 410 uses the CYMK color model and comprises four separate bitmaps, one for each of the four color channels. Data representing one-half of a print line is isolated from each of the image bitmaps 411-414 into a respective one of compression buffers 421-424. The preferred embodiment uses a one-half line compression buffer which is considered to be an acceptable balance of buffer memory size and transfer speed considerations in the particular implementation. One skilled in the art will recognize that the invention is not limited to any particular size or format (e.g., fixed or variable) of data segment.

The data in each of compression buffers 421-424 are compressed using a run length encoding (RLE) algorithm, with the results placed in a respective one of compressed data buffers 431-434.

A serial datastream buffer 450 is constructed using the half-line compressed image data for each of the four channels. Effectively, the serial datastream buffer 450 is constructed by prefixing the compressed image data for each channel with an identifier to denote its respective channel (i.e., color), and then placing the prefixed data segments for each of the four channels successively into the buffer. In the preferred embodiment the identifier fields 461-464 each comprise a two-bit binary value permitting the identification of four different channels: 00, 01, 10, and 11. This implementation makes it possible to easily use the identifier data itself as the alignment signal that controls downstream switch 320. The design of a specific implementation of circuitry to utilize the ID data as the control signal for the switch is within the skill of one in the art. While the preferred embodiment uses a two-bit binary representation for ID, many other representations are possible.

Serial datastream 470 depicts the data of serial datastream buffer 450 in transit—as, for example, from workstation 171 to imaging device 100 over network 160 of FIG. 1.

Referring again to FIG. 4, the progression depicted in box 403 takes place in the imaging device. Serial datastream buffer 480 is filled with the depicted data as datastream 470 is received. Effectively, the transmission buffer 450 of the sending device is reproduced as receive buffer 480 in the imaging device. In accord with the earlier description of FIG. 3, the ID data in the datastream buffer 480 is sent to switch 320 as an alignment signal to direct subsequent image data into the buffer corresponding to the identified channel. The compressed image data immediately following the ID data in the datastream buffer 480 is directed to decompressor 310. Uncompressed image data emerging from decompressor 310 is routed into the appropriate one of half-line, uncompressed image buffers 341-344 via switch 320. Data from buffers 341-344 transfer as four separate channels to output device 360 in accordance with the specifications and requirements of the output device.

Figure 5:
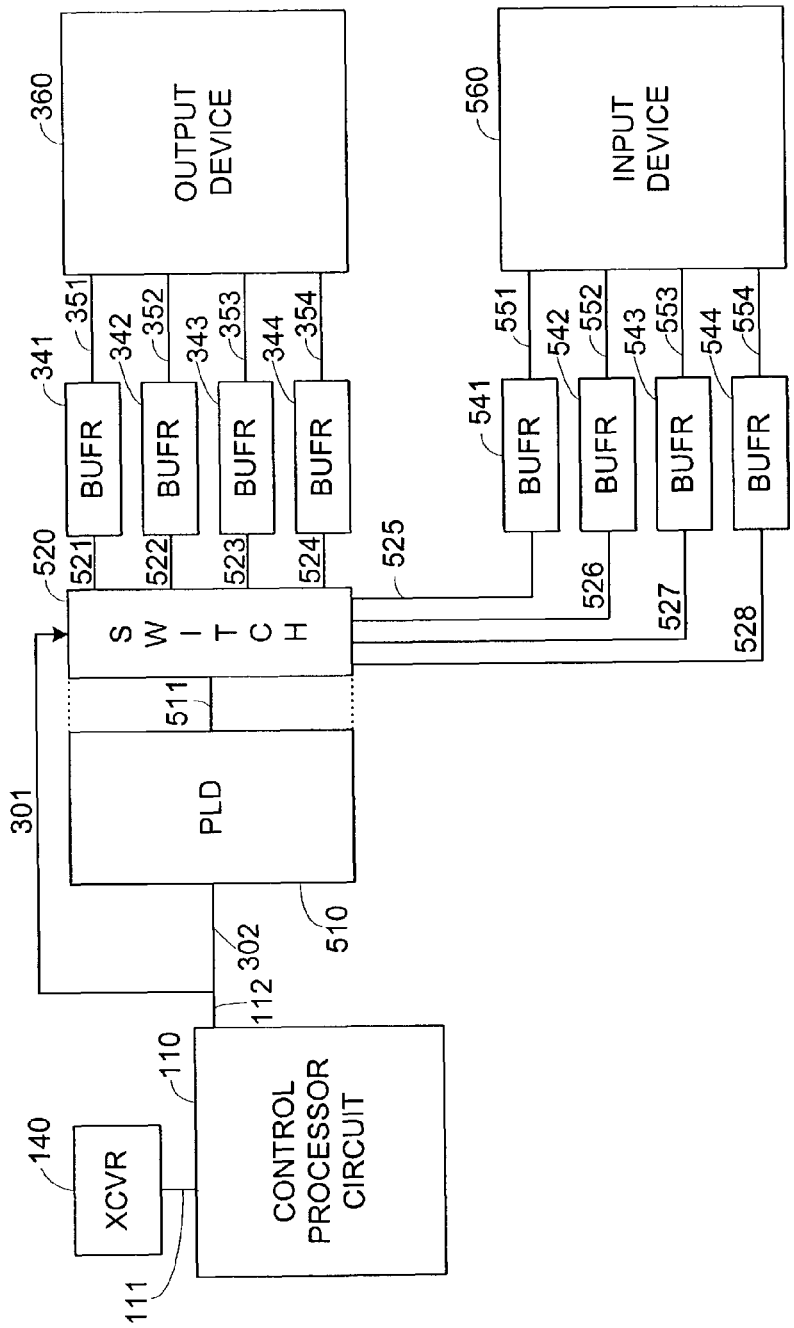
FIG. 5 depicts a multi-function controller further employing a variable function aspect of the present invention.

FIG. 5 depicts a multi-function controller further employing a variable function aspect of the present invention. The depicted controller expands on the controller depicted in FIG. 3, chiefly by adding accommodation to control an input device 560, and replacing the decompressor circuit 310 of FIG. 3 with the reprogrammable logic device 510 of FIG. 5. Accordingly, control processor 110, transceiver 140, buffers 341-344, output device 360, and connections 111, 112, 301, 302, and 351-354, are as described earlier in reference to FIG. 3.

Switch 520 of FIG. 5 is an expanded version of switch 320 of FIG. 3. Connection 511 of FIG. 5 is a multiplex connection that can carry data for multiple image data channels and compares to connection 311 of FIG. 3. Connections 521-524 of switch 520 of FIG. 5 are outputs that correspond to connections 321-324 of switch 320 of FIG. 3. Connections 525-528 of switch 520 of FIG. 5 have no correspondence in FIG. 3 and are data inputs to switch 520. Each of connections 525-528 services one channel of data for a multi-channel image. Each of connections 525-528 conveys data from a corresponding one of uncompressed image data buffers 541-544. Each of buffers 541-544 receives a single channel of uncompressed image data from input device 560 over a corresponding one of connections 551-554. Input device 560 may be, for example, a color image scanner. Input device 560, like output device 360, is not part of the controller circuitry but is shown here to depict operational context.

Switch 520 operates to demultiplex from connection 511 to connections 521-524 to convey image data from control processor 110 toward an output device 360, after the fashion of switch 320 of FIG. 3. Switch 520 further operates to multiplex from connections 525-528 to connection 511 to convey image data from an image input device 560 toward control processor 110. An alignment control signal presented from control processor 110 to switch 520 via connection 301 determines which of connections 521-528 is operatively coupled to connection 511, implicity or explicity identifying both a direction and a channel.

Programmable logic device (PLD) 510 sits in the data path between control processor 110 and switch 520 in the preferred embodiment. PLD 510 exchanges data with the control processor 110 via connection 302, and with switch 520 via connection 511. PLD 510 is susceptible to reprogramming (i.e., all or part of its configuration memory can be reloaded to redefine its operation in the circuit) during operation of the imaging device. In the preferred embodiment, PLD 510 is a FPGA device such as those marketed by Altera Corporation and Xilinx, Inc. Also, in the preferred embodiment the reprogramming of PLD 510 is accomplished by reloading all, not part, of its configuration memory.

During operation of the imaging device, control processor 110 reprograms the PLD as necessary to provide functionality useful to the present mode of operation, while at the same time eliminating programming in the PLD for earlier functionality that is not presently needed. For example, an illustrative multi-function imaging device can either be printing at a given moment, or scanning, but never both at the same instant. Decompression circuitry is required for printing but not scanning, and compression circuitry is required for scanning but not printing. That is to say, there is no temporal overlap required of the compression and decompression functions in this device.

In accordance with an aspect of the present invention, the control processor 110 loads a configuration file defining decompression functionality into the PLD 510 at the commencement of one mode of operation, for example, output (printing). If the device user at some later time signals an input operation, for example, by pressing a "scan" button on the device control panel, the control processor 110 loads an alternate configuration file defining compression functionality into the PLD 510. In the preferred embodiment, the various configuration files for PLD 510 are stored in flash memory.

Note that mode of operation as used above does not necessarily correspond one-to-one with the functions available in a multi-function device. For example, the copy function of a multifunction device involves both an input mode of operation to scan the original, and an output mode of operation to print the copy. Further, input and output are not the only possible modes of operation. For example, an imaging device may have an idle mode activated by a long period of inactivity.

Figure 6:
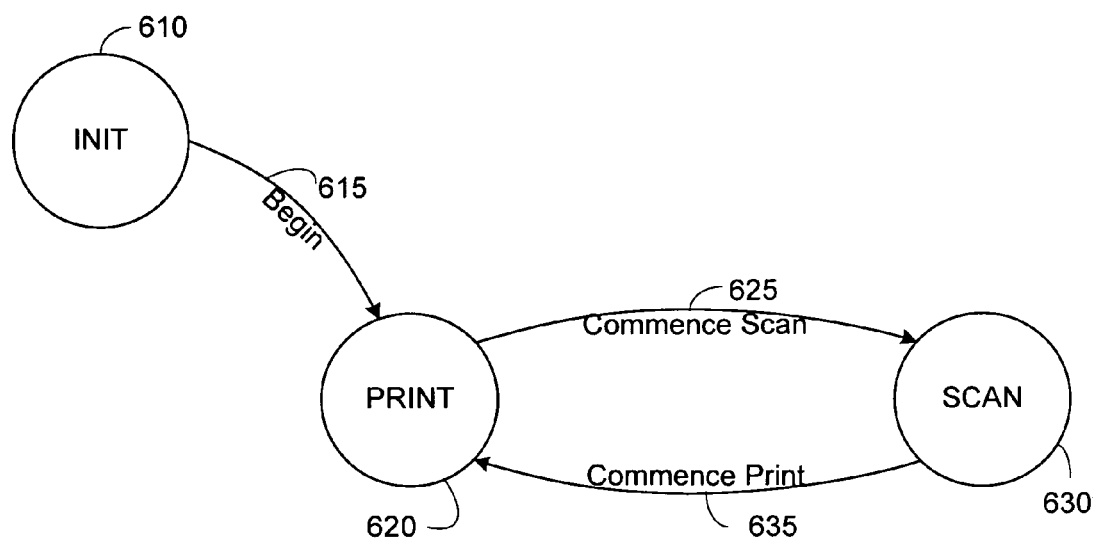
FIG. 6 depicts one modal flow diagram for the controller depicted in FIG. 5.

FIG. 6 depicts one modal flow diagram for the controller depicted in FIG. 5. The multi-function device controller enters an initialization mode 610 when the imaging device is first powered on. After performing any power-up an initialization processing, such as performing a diagnostic system check, the controller moves to begin functional operation of the imaging device as depicted by event 615. The controller begins functional operation by entering a default mode of operation, shown here as print mode 620. Print mode 620 programs the PLD of the controller with a configuration file defining decompression functionality for the PLD device. Print mode 620 operation continues, and the PLD continues to operate as a decompressor, until the occurrence of a commence scan event 625. A commence scan event may be signaled, for example, by the pressing of the scan button on the control panel of the imaging device. The occurrence of the commence scan event 625 causes the controller to move to scan mode 630.

Scan mode 630 programs the PLD of the controller with a configuration file defining compression functionality for the PLD device. Scan mode 630 operation continues, and the PLD continues to operate as a compressor, until the occurrence of a commence print event 635. A commence print event may be signaled, for example, by the arrival of a print datastream at the receiver circuit of the network-attached transceiver. The occurrence of the commence print event 635 causes the controller to move to print mode 620 with performance of the concomitant device operation described earlier for that mode.

Various modifications to the preferred embodiment can be made without departing from the scope of the invention. For example, one skilled in the art will now recognize that the switch circuit 520 of FIG. 5 could be implemented using a portion of the configurable circuitry of PLD 510. And, for example, circuitry that performs compression and/or decompression could be connected directly to transceiver circuitry rather than being coupled through control circuitry for the exchange of image data. Thus, the foregoing description is not intended to limit the invention which is described in the appended claims in which:

What is claimed is:

1. An imaging device controller circuit comprising:

a control circuit;

a field-programmable gate array device coupled directly to the control circuit, and including configuration memory; and a switch coupled directly to the control circuit having a plurality of color data channel connections and a multiplexed connection coupled directly to the field-programmable gate array device, the switch being configured to couple one of the color data channel connections to the multiplexed connection in response to a signal from the control circuit, wherein the control circuit is configured to load a first configuration program into the configuration memory to configure the field-programmable gate array device to process image data in a first mode of operation, the first mode being associated with an operation of the control circuit comprising one of printing, scanning, receiving a facsimile transmission, and transmitting a facsimile transmission;

wherein the control circuit is configured to load, in response to a signal to initiate a second mode of operation different from the first mode of operation, the configuration memory with a second configuration program to configure the field-programmable gate array device to process image data in the second mode of operation, the second mode being associated with an operation of the control circuit different from the first operation comprising one of printing, scanning, receiving a facsimile transmission, or transmitting a facsimile transmission; and wherein, in loading of the configuration memory with said second configuration program, the control circuit eliminates the first configuration program from the configuration memory.

2. The imaging device controller circuit of claim 1, wherein the first and second modes of operation comprise compression or decompression of image data.

3. A method for controlling the operation of an imaging device, comprising:

loading a first configuration program into configuration memory of a field-programmable gate array device to configure the field-programmable gate array device to process image data in a first mode of operation, the first mode being associated with an operation of the imaging device comprising one of printing, scanning, receiving a facsimile transmission, or transmitting a facsimile transmission;

detecting a signal to initiate a second mode of operation different from the first mode of operation;

reloading at least a portion of the configuration memory with a second configuration program in response to the signal to configure the field-programmable gate array device to process image data in the second mode of operation, the second mode being associated with an operation of the imaging device comprising one of printing, scanning, receiving a facsimile transmission, or transmitting a facsimile transmission;

eliminating the first configuration program data from the configuration memory; and coupling one of a plurality of color data channel connections to a multiplexed connection coupled directly to the field-programmable gate array device.

4. An imaging device controller circuit comprising:
a control circuit;
a field-programmable gate array device, coupled directly to the control circuit, and including configuration memory; and
a switch coupled directly to the control circuit having a plurality of color data channel connections and a multiplexed connection coupled directly to the field-programmable gate array device, the switch being configured to couple one of the color data channel connections to the multiplexed connection in response to a signal from the control circuit,
wherein the control circuit is configured to load a first configuration program into the configuration memory to configure the field-programmable gate array device to process image data in a first mode of operation, the first mode being associated with an operation of the control circuit comprising one of printing, scanning, receiving a facsimile transmission, and transmitting a facsimile transmission; and
wherein, the control circuit is configured to, in response to a signal to initiate a second mode of operation, eliminate the first configuration program data from the configuration memory and load the configuration memory with a second configuration program to configure the field-programmable gate array device to process the image data in a second mode of operation different from the first mode of operation, the second mode being associated with an operation of the control circuit different from the first operation comprising one of printing, scanning, receiving a facsimile transmission, or transmitting a facsimile transmission.

5. The imaging device control circuit of claim 4, wherein during each of the first mode of operation and the second mode of operation, image data size is changed.

6. The imaging device control circuit of claim 4, wherein the image data includes bitmap image data.

7. The imaging device control circuit of claim 6, wherein the bitmap image data have been developed from print data in a form of page description language.

8. The imaging device control circuit of claim 6, wherein a first bitmap image data is subject to processing in the first mode of operation, and a second bitmap image data is subject to processing in the second mode of operation.

* * * * *